United States Patent Office 2,988,552
Patented June 13, 1961

2,988,552
PROCESS OF PREPARING 2,3-SECO-3-OXO-20α-YOHIMBANE COMPOUNDS AND PRODUCTS OBTAINED THEREBY
Jean Jolly, Fontenay-sous-Bois, and Robert Joly, Montmorency, France, assignors to Les Laboratoires Français de Chimiotherapie, Paris, France, a corporation of France
No Drawing. Filed July 30, 1958, Ser. No. 751,872
Claims priority, application France Aug. 9, 1957
7 Claims. (Cl. 260—287)

The present invention relates to a process of preparing 2,3-seco-3-oxo-20α-yohimbane compounds and more particularly to an improved cyclization process, and to products obtained thereby.

2,3-seco-3-oxo-20α-yohimbane compounds have been prepared heretofore by condensing the methyl ester of 1β-carboxy methyl-2β-methoxy carbonyl-3α-methoxy-4β-acetoxy-6β-formyl cyclohexane with a tryptamine compound and subjecting the resulting Schiff base to simultaneous reduction and cyclization. This process has the great disadvantage that the preparation of the starting material, i.e. the methyl ester of 1β-carboxy methyl-2β-methoxy carbonyl-3α-methoxy-4β-acetoxy-6β-formyl cyclohexane is rather difficult. This compound is prepared by esterification of 1β-carboxy methyl-2β-methoxy carbonyl-3α-methoxy-4β-acetoxy-6β-formyl cyclohexane of Formula I given hereinafter, by means of diazomethane. Through the last mentioned cyclohexane compound can be readily produced on an industrial scale, the diazomethane esterification is a cumbersome operation. Furthermore, reductive cyclization of the Schiff base according to the processes heretofore known does not proceed quantitatively.

It is therefore one object of the present invention to provide a simple and effective process of producing 2,3-seco-3-oxo-20α-yohimbane compounds which are useful as intermediates in the preparation of compounds of the reserpine series.

Another object of the present invention is to provide new and valuable intermediates obtained in the course of said process.

These and other objects of the present invention and advantageous features thereof will become apparent as the description proceeds.

In principle, the present invention involves the preparation of 2,3-seco-3-oxo-20α-yohimbane compounds of the general Formula V

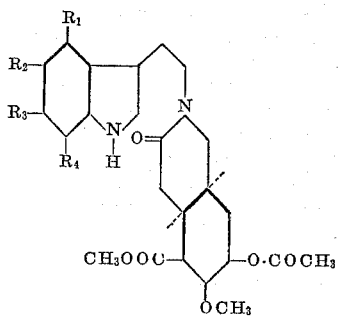

wherein $R_1$, $R_2$, $R_3$ and $R_4$ indicate hydrogen, halogen, especially chlorine and bromine, a lower alkoxy group, the hydroxyl group, or a lower alkyl radical. Said substituents may be different from each other or they may be alike and the benzene ring may be mono-, di-, or, respectively, tri-substituted.

According to the present invention said 2,3-seco-3-oxo-20α-yohimbane compounds are prepared by condensing a salt of 1β-carboxymethyl 2β- methoxy carbonyl-3α-methoxy-4β-acetoxy-6β-formyl cyclohexane of Formula I with an organic or inorganic base, such as the triethylamine salt or the sodium or potassium salt of said acid with the desired tryptamine compound of Formula II, to yield the corresponding salt of the Schiff base of Formula III. Said salt of the Schiff base of Formula III, i.e. the salt of 18β-acetoxy-17α-methoxy-16β-methoxy carbonyl - 2,3 - 3,4 - diseco - $\Delta^{4,21}$ - 20α - yohimbene-3-oic acid is hydrogenated at a low temperature whereby the double bond is saturated and the compound of Formula IV, i.e. 18β-acetoxy-17α-methoxy-16β-methoxy carbonyl-2,3-3,4-diseco-20α-yohimbane-3-oic acid is obtained. When heating said saturated yohimbane compound of Formula IV at a temperature between about 100° C. and its melting point and preferably at a temperature of about 150° C., water is split off and cyclization takes places. Thereby, the lactam compound of Formula V, i.e. 18β-acetoxy-17α-methoxy-16β-methoxy carbonyl-2,3-seco-3-oxo-20α yohimbane, is obtained in a high yield.

The carboxylic acid compound of Formula I can readily be prepared on an industrial scale according to the process described in commonly assigned applications Serial No. 693,028, filed October 29, 1957, now Patent No. 2,952,682, and entitled "Polycyclic Compounds and Process of Preparing Same," and copending Serial No. 727,780, filed April 9, 1958, and entitled "Process of Producing a Substituted Aldehyde," by ozonizing the methyl ester of 3β-acetoxy-2α-methoxy-7-oxo-1,2,3,4, 4α,7,8,8aα - octahydronaphthalene - 1β - carboxylic acid and decomposing the resulting ozonide at a low temperature.

The process according to the present invention considerably simplifies the preparation of reserpine compounds on an industrial scale because the use of diazomethane which is an expensive, highly toxic reagent difficult to handle on large scale operation, is avoided. Furthermore, the yield of the lactam compound of Formula V is considerably higher than heretofore attainable.

The following examples serve to illustrate the present invention without, however, limiting the same thereto. More particularly, other inorganic or organic basic compounds than those mentioned hereinabove may be used for preparing the salts of the compound of Formula IV; the reaction temperature may be varied; other tryptamine compounds may be used for the preparation of the Schiff base of Formula III, for instance, 5-chloro-6-methoxy tryptamine, 6-chloro tryptamine, 5-methoxy tryptamine, 5-chloro tryptamine, 7-methoxy tryptamine, 7-chloro tryptamine and others; and the racemic mixtures of the aldehyde of Formula I may be employed as starting material in accordance with the principles set forth herein and in the claims annexed hereto.

The reaction according to the present invention is furthermore illustrated by the reaction diagram on the following formula sheet.

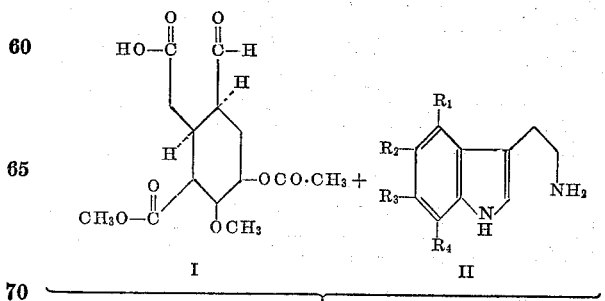

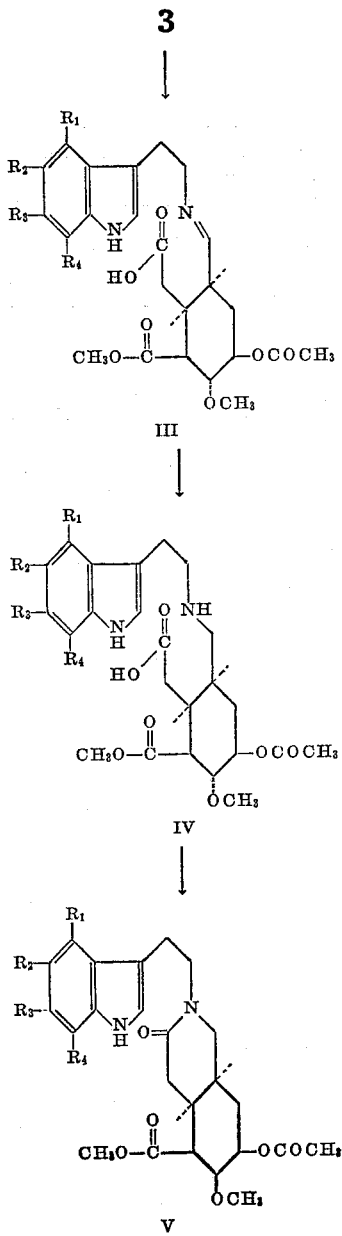

The melting points are instantaneous melting points determined on the Maquenne block.

EXAMPLE 1

*Preparation of the triethylamine salt of 1β-carboxy methyl - 2β - methoxy carbonyl - 3α - methoxy - 4β - acetoxy-6β-formyl cyclohexane*

(Formula I)

5 g. of the compound of Formula I, having a rotary power of $[\alpha]_D^{20} = +142°$ (in pyridine, concentration: 1%) are added to 50 cc. of water while stirring and passing nitrogen through the suspension and cooling the same to a temperature between 0° C. and +5° C. 2.6 cc. of triethylamine (corresponding to an excess of 20%) are added to said suspension. A clear solution of the desired salt is obtained which can directly be used for further reaction.

EXAMPLE 2

*Preparation of the triethylamine salt of 18β-acetoxy-11,17α-dimethoxy-16β-methoxy carbonyl-2,3-3,4-diseco-$\Delta^{4,21}$-20α-yohimbene-3-oic acid*

(Formula III wherein $R_3=OCH_3$; $R_1$, $R_2$, $R_4=H$)

3.3 g. of 6-methoxy tryptamine (Formula II, wherein $R_3=OCH_3$, $R_1$, $R_2$, $R_4=H$) are added within about two minutes to the solution of the triethylamine salt of the compound of Formula I prepared according to Example 1 while keeping the solution at a temperature between 0 and +5° C., stirring, and bubbling nitrogen therethrough. After 45 minutes, a yellow clear solution of the desired salt is obtained.

EXAMPLE 3

*Preparation of 18β-acetoxy-11,17α-dimethoxy-16β-methoxy carbonyl-2,3-3,4-diseco-20α-yohimbane-3-oic acid*

(Formula IV, wherein $R_3=OCH_3$; $R_1$, $R_2$, $R_4=H$)

0.75 g. of potassium boronhydride are added in small portions and very slowly to the solution of the salt of the Schiff base of Formula III, obtained according to Example 2. After standing for 15 minutes at +5° C., the temperature is allowed to rise to 15–20° C. 5 cc. of methanol are added and the solution is slowly acidified to a pH of 5–6 by the addition of about 18% hydrochloric acid. The acid compound of Formula IV crystallizes. After standing at +5° C. for 30 minutes, the crystals are filtered off with suction and washed with water. After drying 6.45 g. (83% of the theoretical yield) of the desired carboxylic acid of Formula IV are obtained. The compound has a rotary power of $[\alpha]_D^{20} = -39°$ (concentration: 0.5% in pyridine). It does not melt but it sinters when heated on the block at 140–145° C. and is dehydrated at about 150° C. whereby the lactam compound of Formula V is formed.

*Analysis.*—$C_{25}H_{34}O_8N_2=490.54$. Calculated: 61.21% C; 6.98% H; 26.09% O; 5.71% N. Found: 61.3% C; 6.9% H; 26.1% O; 5.8% N.

*Acid number.*—Calculated: 114. Found: 113.

The carboxylic acid of Formula IV behaves as an amino acid. It is soluble in dilute alkali hydroxide solutions as well as in dilute acids.

The compound has not yet been described in the literature.

When using the equivalent amount of potassium bicarbonate or sodium bicarbonate, in place of triethylamine as it is employed in the preceding examples, the same product is obtained. Thereby, first the potassium or sodium salts of the compounds of Formulas I and III are formed which are converted into the 3-oic acid of Formula IV by following the procedure of the preceding examples.

EXAMPLE 4

*Preparation of 18β-acetoxy-11,17α-dimethoxy-16β-methoxy carbonyl-2,3-seco-3-oxo-20α-yohimbane*

(Formula V, wherein $R_3=OCH_3$; $R_1$, $R_2$, $R_4=H$)

3 g. of the carboxylic acid of Formula IV, prepared according to Example 3 are dissolved in 3 cc. of cold dimethyl formamide and the solution is heated at 150–155° C. for 5–7 minutes. After cooling to 15–20° C. the solution is poured in 30 cc. of ice water and the mixture is stirred for 30 minutes. The precipitated crystals are filtered off with suction, washed with water, and dried at 80° C. The desired 18β-acetoxy-11,17α-dimethoxy-16β-methoxy carbonyl-2-3-seco-3-oxo-20α-yohimbane of Formula V is obtained in a yield of 96% of the theoretical amount. It melts at 162° C., then solidifies, and melts again at 184° C. It has a rotatory power of $[\alpha]_D^{20} = +31° +3$ (concentration: 0.5% in ethanol).

*Acid number.*—Calculated: 237. Found: 231.5.

EXAMPLE 5

*Preparation of the triethylamine salt of 18β-acetoxy-17α-methoxy-16β-methoxy carbonyl -2,3-3,4-diseco-$\Delta^{4,21}$-20α-yohimbene-3-oic acid*

(Formula III, wherein $R_1$, $R_2$, $R_3$, $R_4=H$)

On proceeding according to Example 2, using the solution of the triethylamine salt of the carboxylic acid of Formula I, corresponding to 5 g. of said acid, and condensing said salt with 2.7 g. of tryptamine (Formula II, wherein $R_1$, $R_2$, $R_3$, $R_4$=H), the desired triethylamine salt of the 20α- yohimbene compound of Formula III is obtained.

EXAMPLE 6

*Preparation of 18β-acetoxy-17α-methoxy-16β-methoxy carbonyl-2,3-3,4-diseco-20α-yohimbane-3-oic acid*

(Formula IV, wherein $R_1$, $R_2$, $R_3$, $R_4$=H)

The solution obtained according to Example 5 is treated by following the procedure described in Example 3.

The resulting carboxylic acid of Formula IV has a rotatory power of $[\alpha]_D^{20}=-35.5°$ (concentration: 0.5% in pyridine). It contains half a mole of water of crystallization. The compound does not melt but sinters when heated on the block and is dehydrated at about 150° C. whereby the lactam corresponding to Formula V is obtained.

*Analysis.*—$C_{24}H_{32}O_7N_2 + \frac{1}{2}H_2O = 469.52$. Calculated (with ½ mole of water): 61.38% C; 7.08% H; 25.56% O; 5.97% N. Found: 61.48% C; 7.02% H; 25.8% O; 5.9% N.

The compound has not yet been described in the literature.

EXAMPLE 7

*Preparation of 18β-acetoxy-17α-methoxy-16β-methoxy carbonyl-2,3-seco-3-oxo-20α-yohimbane*

(Formula V, wherein $R_1$, $R_2$, $R_3$, $R_4$=H)

1 g. of the carboxylic acid obtained according to Example 6 is heated in dimethyl formamide by following the procedure described in Example 4. Thereby, 18β-acetoxy-17α-methoxy-16β-methoxy carbonyl-2,3-seco-3-oxo-20α-yohimbane is obtained. The compound has a melting point of 178–179° C. and a rotatory power of $[\alpha]_D^{20}=-30°\pm1.5°$ (concentration: 1% in chloroform).

The compound has not yet been described.

As stated hereinabove, the salts of 1β-carboxy methyl-2β-methoxy carbonyl-3α-methoxy-4β-acetoxy-6β-formyl cyclohexane may be condensed with other tryptamine compounds of Formula II to yield the corresponding salts of other 18β-acetoxy-17α-methoxy-16β-methoxy carbonyl-2,3-3,4-diseco-$\Delta^{4,21}$-20α-yohimbene-3-oic acids of Formula III. For instance—

| with— | there is obtained the compound of Formula III wherein— |
|---|---|
| 5-methoxy tryptamine | $R_2$=OCH$_3$; $R_1$, $R_3$, $R_4$=H |
| 7-methoxy tryptamine | $R_4$=OCH$_3$; $R_1$, $R_2$, $R_3$=H |
| 4,5,6-trimethoxy tryptamine | $R_1$, $R_2$, $R_3$=OCH$_3$; $R_4$=H |
| 5-chloro tryptamine | $R_2$=Cl; $R_1$, $R_3$, $R_4$=H |
| 6-chloro tryptamine | $R_3$=Cl; $R_1$, $R_2$, $R_4$=H |
| 7-chloro tryptamine | $R_4$=Cl; $R_1$, $R_2$, $R_3$=H |
| 4,7-dichloro tryptamine | $R_1$, $R_4$=Cl; $R_2$, $R_3$=H |
| 6,7-dichloro tryptamine | $R_3$, $R_4$=Cl; $R_1$, $R_2$=H |
| 4-chloro-7-methoxy tryptamine | $R_1$=Cl; $R_4$=OCH$_3$; $R_2$, $R_3$=H |
| 5-chloro-6-methoxy tryptamine | $R_2$=Cl; $R_3$=OCH$_3$; $R_1$, $R_4$=H |
| 6-chloro-7-methoxy tryptamine | $R_3$=Cl; $R_4$=OCH$_3$; $R_1$, $R_2$=H |
| 7-chloro-6-methoxy tryptamine | $R_4$=Cl; $R_3$=OCH$_3$; $R_1$, $R_2$=H |
| 6-methyl tryptamine | $R_3$=CH$_3$; $R_1$, $R_2$, $R_4$=H |
| 7-methyl tryptamine | $R_4$=CH$_3$; $R_1$, $R_2$, $R_3$=H |

Conversion of the salts of the resulting compounds of Formula III, as they can be obtained with the above mentioned and other substituted tryptamine compounds, into the corresponding saturated 18β-acetoxy-17α-methoxy-16β-methoxy carbonyl-2,3-3,4-diseco-20α-yohimbane-3-oic acid compounds of Formula IV is effected by reduction with potassium boronhydride and into the corresponding 18β-acetoxy-17α-methoxy-16β-methoxy carbonyl-2,3-seco-3-oxo-20α-yohimbane compound of Formula V by heating to about 150° C. as described in the preceding examples. Further conversion of the compounds of Formula V into reserpine-like compounds is carried out, for instance, as described in the above mentioned copending applications and in copending commonly assigned application Serial No. 727,777.

We claim:

1. The process of preparing a 2,3-seco-3-oxo-20α-yohimbane compound of the formula

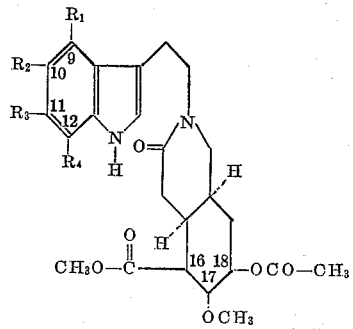

wherein $R_1$, $R_2$, $R_3$ and $R_4$ represent members selected from the group consisting of hydrogen, chlorine, methoxy and methyl which comprises the steps of forming a water-soluble salt of 1β-carboxy methyl-2β-methoxy carbonyl-3α-methoxy-4β-acetoxy - 6β - formyl-cyclohexane in water, adding a tryptamine compound of the formula

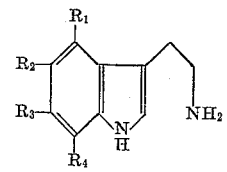

where $R_1$, $R_2$, $R_3$ and $R_4$ have the meaning assigned above, adding an alkali metal boronhydride to the resulting Schiff base at a temperature between 0° C. and room temperature to cause hydrogenation of the N=C double bond, neutralizing the resulting solution with an acid, separating the 18β-acetoxy-17α-methoxy-16β-methoxy carbonyl-2,3-3,4-diseco-20α-yohimbane-3-oic acid of the formula

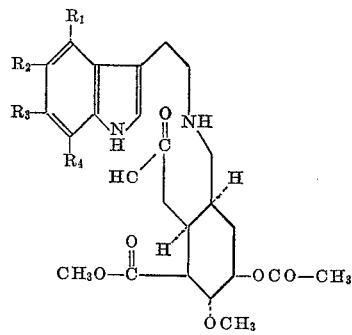

wherein $R_1$, $R_2$, $R_3$ and $R_4$ have the meanings above assigned, heating said acid to a temperature between about 100° C. and its melting point to cause cyclization and recovering said 2,3-seco-3-oxo-20α-yohimbane compound.

2. The process of preparing 18β-acetoxy-11,17α-dimethoxy -16β- methoxy carbonyl -2,3- seco -3- oxo-20α-yohimbane which comprises the steps of forming a water-soluble salt of 1β-carboxy methyl-2β-methoxy carbonyl-3α-methoxy-4β-acetoxy-6β-formyl-cyclohexane in water, adding 6-methoxy-tryptamine, adding an alkali metal boronhydride to the resulting Schiff base at a temperature between 0° C. and room temperature to cause hydrogenation of the N=C double bond, neutralizing the resulting solution with an acid, separating the 18β-acetoxy-11,17α - dimethoxy - 16β - methoxy carbonyl - 2,3-3,4-diseco-20α-yohimbane-3-oic acid, heating said acid to a temperature between about 100° C. and its melting point to cause cyclization and recovering said 2,3-seco-3-oxo-20α-yohimbane compound.

3. The process of preparing 18β-acetoxy-17α-methoxy-

16β-methoxy carbonyl-2,3-seco-3-oxo-20α-yohimbane which comprises the steps of forming a water-soluble salt of 1β-carboxy methyl-2β-methoxy carbonyl-3α-methoxy-4β-acetoxy-6β-formyl-cyclohexane in water, adding tryptamine, adding an alkali metal boronhydride to the resulting Schiff base at a temperature between 0° C. and room temperature to cause hydrogenation of the N=C double bond, neutralizing the resulting solution with an acid, separating the 18β-acetoxy-17α-methoxy-16β-methoxy carbonyl -2,3-3,4- diseco -20α- yohimbane-3-oic acid, heating said acid to a temperature between about 100° C. and its melting point to cause cyclization and recovering said 2,3-seco-3-oxo-20α-yohimbane compound.

4. The process according to claim 1, wherein the said soluble salt of 1β-carboxy methyl-2β-methoxy carbonyl-3α-methoxy-4β-acetoxy-6β-formyl cyclohexane is a salt selected from the group consisting of the potassium salt, the sodium salt, and the triethylamine salt.

5. The process according to claim 1, wherein the alkali metal boronhydride is a compound selected from the group consisting of potassium boronhydride and sodium boronhydride.

6. The proocess according to claim 1, wherein cyclization is carried out at about 150° C.

7. The process according to claim 1, wherein cyclization is carried out in dimethyl formamide.

References Cited in the file of this patent
UNITED STATES PATENTS 2,857,385   Kuehne _____ Oct. 21, 1958
2,883,384   Woodward _____ Apr. 21, 1959

OTHER REFERENCES

Woodward et al.: J. Am. Chem. Soc., vol. 78, pp. 2023–5 (1956).